May 2, 1950 J. M. MELICK 2,506,429

SELECTIVE SIGNALING SYSTEM

Filed May 31, 1946 2 Sheets-Sheet 1

INVENTOR
J. M. MELICK
BY
R. O. Covell
ATTORNEY

INVENTOR
J. M. MELICK
BY R. O. Covell
ATTORNEY

Patented May 2, 1950

2,506,429

UNITED STATES PATENT OFFICE 2,506,429

SELECTIVE SIGNALING SYSTEM

John M. Melick, Cresskill, N. J., assignor to Bell Telephone Laboratories, Incorporated, New York, N. Y., a corporation of New York Application May 31, 1946, Serial No. 673,276

5 Claims. (Cl. 177—353)

Figure 1:
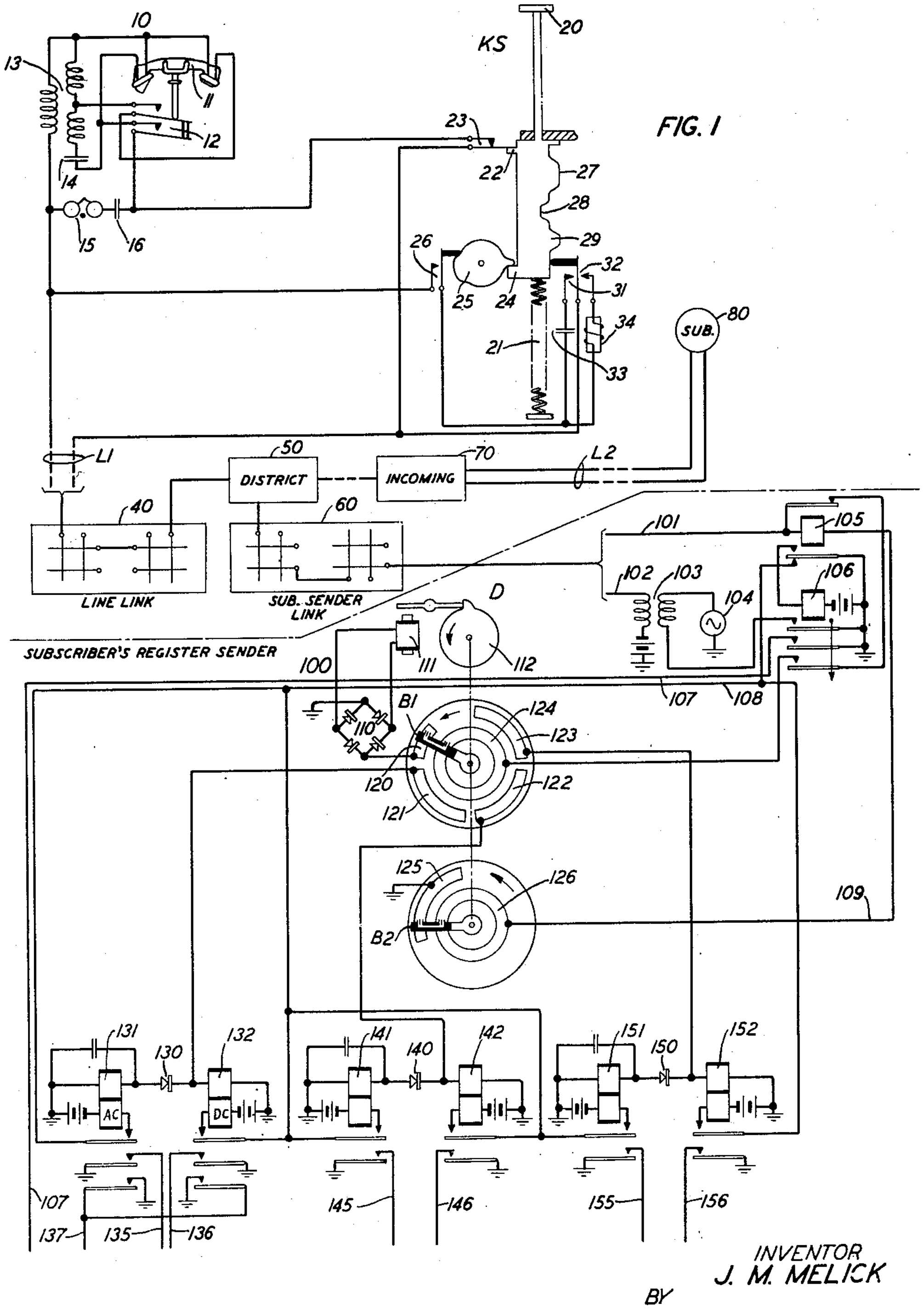

This invention relates to signaling systems and particularly to selective signaling adapted for use in automatic telephone systems.

Objects of the invention are an increase in the speed and efficiency of selective signaling in automatic telephone systems and generally the provision of new and improved selective signaling arrangements.

Heretofore selective signaling systems have been arranged to transmit a plurality of different signals by using currents of different amplitude or polarity together with marginal and polarized signal receiving relays, to transmit a different number of successive current impulses for each different signal, and to transmit alternating current of different frequency or phase for each different signal. It is also known to use both direct and alternating current for selective signaling.

This invention is a signaling system arranged so that the transmission of each of a plurality of different selective signals is effected by the transmission of one, two or three current impulses, each impulse being either direct current or alternating current. Since a maximum of three impulses is required for any signal, all of the digits of a called subscriber's number may be transmitted in a short interval of time and, by providing key-set signal transmitters at the subscribers' stations, the signal impulses are transmitted with minimum effort and maximum accuracy.

A feature of the invention is a selective signal transmitter arranged to transmit signals consisting of either one, two or three impulses in succession, each impulse being either direct or alternating current, and arranged so that an open-circuit condition precedes the first impulse of each selective signal to prepare the signal receiving means for response to the impulse or impulses which constitute the selective signal being transmitted.

A clear and complete understanding of the invention will be facilitated by considering a signaling system arranged in accordance with the invention and its features, one such system being represented schematically in the drawing which consists of two figures. The invention is, however, not limited in its application to the specific system or apparatus shown in the drawing but is applicable to selective signaling systems generally.

The drawing represents an automatic telephone system comprising switches of the cross bar type and register senders for controlling the establishment of desired connections between calling and called subscriber stations.

Figure 2:
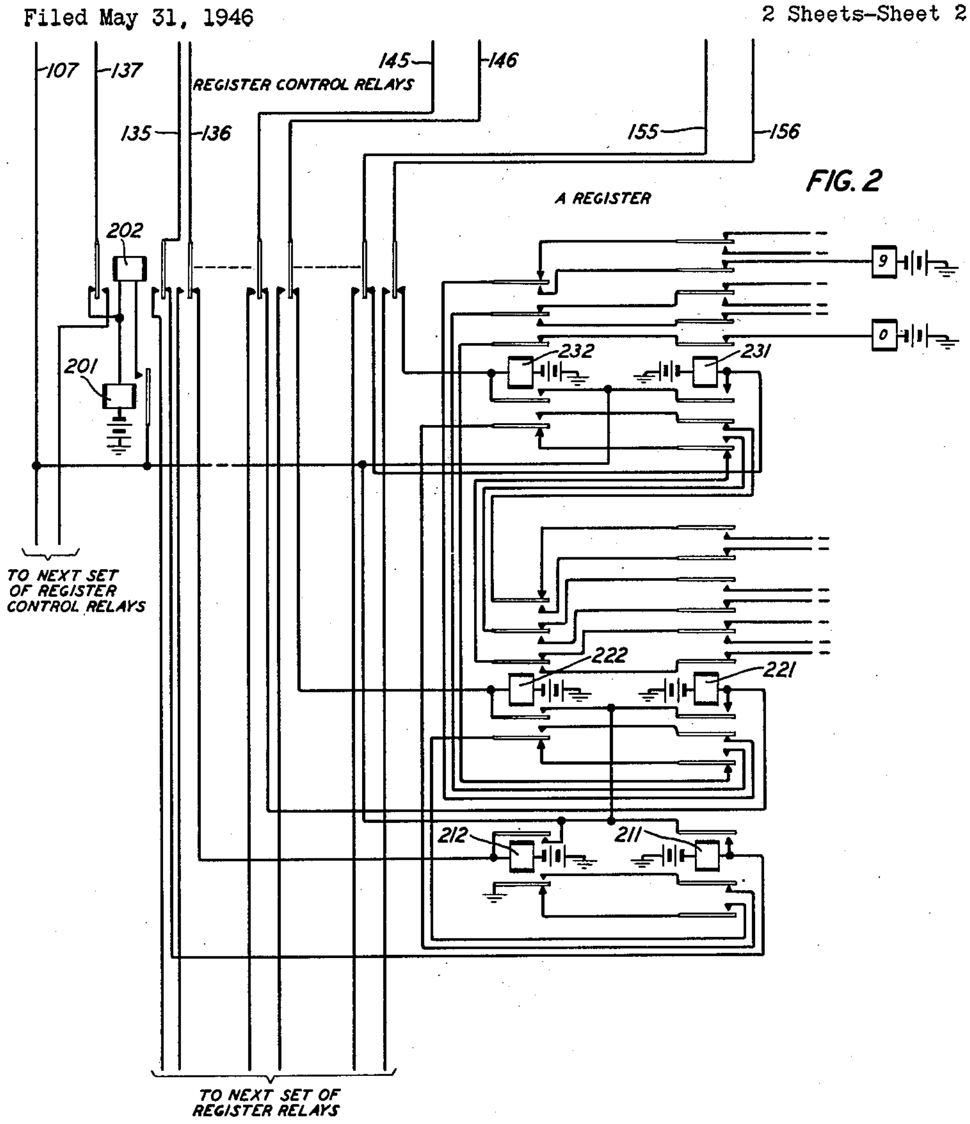

Fig. 1 of the drawing shows a calling subscriber's station 10, a key-set KS for transmitting selective signals, a line link 40 and sender link 60 of the cross bar type, a district 50, incoming 70, and a called subscribers' station 80. Fig. 1 further shows, together with Fig. 2, a subscriber's register sender 100 adapted to receive and register selective signals transmitted from a connected calling subscriber's station such as the station 10.

The subscribed station 10 is of the type usually provided for use with common battery central offices except that the signal sender is of the key-set type. The key-set KS comprises a plurality of keys, one for each of the selective signals which may be transmitted and contact springs 23, 26, 31 and 32 common to all of the keys. Each key consists of a button 20 which may be depressed against the tension of a spring 21. When all keys are in normal position, the contact 23 is closed, and contacts 26, 31 and 32 are open. As soon as a key is moved out of normal position, contact 23 is opened and, just before the key reaches the limit of its motion, the projection 22 engages the cam 25 and rotary movement of cam 25 closes contact 26. Contact 23 remains open and contact 26 remains closed until the key is restored to normal, at which time projection 22 closes contact 23 and projection 24 restores cam 25 to normal thereby opening contact 26. When the key has been fully depressed and the pressure on button 20 is removed, the contacts 31 and 32 are actuated by the key surface 27, 28, 29 to establish impulse circuits through condenser 33 and inductance 34 as required to transmit signal impulses indicative of the particular key which is depressed. Although actuated by the down-stroke of the key as well as by the up-stroke, contacts 31 and 32 are ineffective to transmit signal impulses during the down-stroke due to the fact that contact 26 is not closed until the key is depressed far enough to actuate cam 25. The impulse controlling surface of each key is differently shaped, so that a different signal will be transmitted by the operation of each key. An outwardly projecting portion of the surface, such as 27 or 29, effects closure of contact 32 and a depression, such as 28, effects closure of contact 31. The contacts 23, 26, 31 and 32 are common to all of the keys and only one key can be depressed at a time. The key shown is shaped so that on the release of button 20, contact 32 will close first to transmit a signal impulse through inductance 34, contact 31 will close next to transmit a signal impulse through condenser 33, and contact 32 will then again close to transmit another signal impulse through inductance 34. As hereinafter explained, each closure of contact 32 effects the transmission of a direct current signal impulse through inductance 34 and each closure of contacts 31 effects the transmission of an alternating current signal impulse through condenser 33. Fourteen different signals may be transmitted by providing fourteen different keys, the signal controlling surface of each key being shaped to transmit either one, two or three signal impulses as indicated in the table concluding the description of the system shown in the drawing.

While the keys are all normal, a direct current circuit is closed through contact 23 but this circuit is opened at contact 23 by depressing any key so that an open-circuit condition exists immediately prior to the first signal impulse of each of the fourteen different signals. If decimal signaling is desired, any ten of the fourteen different signals may be used.

The signal receiving means in the register sender 100 comprises a battery or other direct current source connected to one winding of coil 103, an alternating current source 104 connected to the other winding of coil 103, two relays 105 and 106, a rotary distributor D, and three sets of impulse relays, 131 and 132, 141 and 142, and 151 and 152. The register sender further comprises a set of register control relays for each digit transmitted and a set of register relays for each digit. Relays 201 and 202 constitute the register control relays which render the relays 211, 212, 221, 222, 231 and 232 of the A register operatively responsive to the signal impulses representing the first digit of a called subscriber's number. A similar set of register control relays and register relays is provided for each digit to be registered.

The rotary distributor D is of the start-stop type well known in telegraph systems and reference may be had to the patent to E. F. Watson 2,055,567, granted September 29, 1936 for a disclosure of such a distributor. The distributor D comprises a control magnet 111 and two distributor brushes B1 and B2 fixed to a common shaft which is arranged to make one revolution each time the energization of magnet 111 releases the stop cam 112. The functions of the distributor will be apparent from the following description of the transmission and registering of a digit responsive to operation of one of the keys at a connected calling subscriber's station 10.

Assume now that a call is initiated at station 10 by removal of the handset 11, thereby actuating switch 12 to close a loop circuit over the conductors of line L. Assume further that a line link 40 is actuated to extend the line L1 to an idle district 50 and that a sender link 60 is actuated to connect the district 50 to an idle register sender 100. Reference may be had to the patent to Carpenter 2,235,803, granted March 18, 1941, for a complete disclosure of a switching system in which line links and sender links of the cross bar type are provided for connecting a calling line through a district to a subscriber's register sender. Upon completion of the connection between line L1 and the register sender 100, a circuit is closed from battery through the left winding of coil 103, conductor 102, through the link 60, district 50, and line link 40, one conductor of line L1, left winding of coil 13 at station 10, transmitter of handset 11, lower contact of switch 12, contact 23 of the key-set KS, other conductor of line L1, through link 40, district 50, link 60, conductor 101, winding of relay 105, conductor 109, feed ring 126 and brush B2 of distributor D to grounded segment 125. Relay 105 is operatively energized by the current in this circuit, closing a circuit for operating the slow-to-release relay 106. Relay 106 is effective to maintain the connection through link 60 in usual manner. The operation of relay 106 connects ground to conductor 107 and closes a circuit through the right winding of coil 103 and alternating current source 104, whereby alternating current is superimposed on the direct current transmitted over the calling line loop circuit above traced. The alternating current from source 104 may also serve as the dial tone signal to indicate that dialing may be started. When the calling subscriber depresses the key corresponding to the first digit of the call subscriber's number, the calling line loop is opened at contact 23 thereby causing the release of relay 105. The release of relay 105 connects conductor 101 through the upper back contact of relay 105 and outer front contact of relay 106, feed ring 124 and brush B1 and segment 120 of distributor D, and through full wave rectifier 110 and the winding of magnet 111 to ground. When the key reaches the limit of its down-stroke, cam 25 is actuated by the projection 22 to close contact 26; and when the one or the other of contacts 31 and 32 is actuated at the beginning of the upstroke of the key, magnet 111 is operated by the first current impulse to release stop cam 112 and thereby start the rotation of the shaft of the distributor D. Relay 105 does not reoperate since its winding is shunted by the winding of magnet 111. If necessary, a relay may be added to open the circuit path through the winding of relay 105 responsive to the release of relay 105, thereby insuring the operation of magnet 111 without reoperating relay 105 responsive to the first current impulse of a signal. When brush B1 disengages segment 120, magnet 111 releases so that the armature will stop the shaft from further rotation when one revolution is completed. The rate of rotation of distributor D and length of segment 121, is such that brush B1 will be in contact with segment 121 for substantially the same interval of time that contact 31 or contact 32 of the key-set KS is actuated to include either condenser 33 or inductance 34 in series with contact 26 and the conductors of line L1 to transmit the first impulse of the signal corresponding to the first digit of the called subscriber's number. It is to be noted that the upper projection 27 of the impulse controlling surface of key 20 is longer than the depression 28 and lower projection 29 so that the first impulse of a digit signal is longer than the second and third impulses in order to provide time for operating the magnet 111 of the distributor, for rotating brush B1 into engagement with segment 121 and for operating one of impulse relays 131 and 132, while brush B1 is in engagement with segment 121. The rate at which key 20 is restored to normal is such that the second impulse of a digit signal is transmitted while brush B1 is in engagement with segment 122 and the third impulse is transmitted while brush B1 is in engagement with segment 123.

The duration of the closure of contacts 31 and 32 may be approximately as follows:

| First impulse: | Seconds |
|---|---|
| Closure | .030 |
| Open | .015 |
| Second impulse: | |
| Closure | .015 |
| Open | .015 |
| Third impulse: | |
| Closure | .015 |
| Open | .010 |

If during the time brush B1 is in engagement with segment 121, contact 32 of key-set KS is closed, the inclusion of inductance 34 in series with contact 26 and line L1 effects the transmission of a direct current impulse over the line through the upper back contact of relay 105, front contact of relay 106, feed ring 124, brush B1, segment 121 and winding of relay 132 to ground, thereby operating relay 132. Rectifier 130 is poled to prevent the energization of relay 131. If, however, the impulse control surface of key 20 is shaped so that contacts 31 are closed while brush B1 is in engagement with segment 121, the condenser 33 is included in the line loop circuit instead of inductance 34 and the alternating current voltage induced in coil 103 effects the transmission of alternating current in the line loop circuit through contacts 26, condenser 33, contact 31, over line L1, through brush B1 and segment 121 to the windings of relays 131 and 132. Relay 132 is not operatively energized by alternating current but half cycles are transmitted through rectifier 130 to effect the operative energization of the upper winding of relay 131. Thus either relay 131 or relay 132 is operated responsive to the first impulse of a digit signal depending upon whether the line loop circuit is closed through inductance 34 or condenser 33. The operated one of relays 131 and 132 locks through its lower winding to grounded conductor 108. By the time brush B1 has advanced to engage segment 122, the key 20 will have restored sufficiently so that if there is more than one impulse in the digit signal being transmitted, the impulse surface of the key will have actuated either contact 32 or contact 31 to effect the transmission of either a direct current impulse or an alternating current impulse over line L1 depending on the particular digit being transmitted. Since segment 122 is connected to relays 141 and 142, the one or the other of these relays will be operated to register the second impulse of the digit signal being transmitted. The operated one of relays 141 and 142 locks through its lower winding to conductor 108. When brush B1 engages segment 123, the key 20 will have restored sufficiently so that if there is more than two impulses in the digit signal being transmitted, the impulse surface of the key 20 will have actuated either contact 32 or contact 31 to effect the transmission of either a direct current impulse or an alternating current impulse over line L1 depending on the particular digit being transmitted. Since segment 123 is connected to relays 151 and 152, the one or the other of these relays will be operated to register the third impulse of the digit signal being transmitted. The operated one of relays 151 and 152 locks through its lower winding to conductor 108. Thus the signal transmitted by the operation of a particular key corresponding to the first digit of the called subscriber's number effects the operation of either relay 131 or relay 132 alone, the operation of either relay 131 or relay 132 and the operation of either relay 141 or relay 142, or the operation of either relay 131 or relay 132 and the operation of either relay 141 or relay 142 and the operation of either relay 151 or relay 152, depending upon the numerical value of the digit being transmitted.

Relay 105 remains deenergized while the distributor is receiving the signal impulses corresponding to the first digit since the circuit for operating relay 105 is open as soon as brush B1 has advanced sufficiently to disengage segment 125; and the operating path through brush B2 and segment 125 is not again closed until sufficient time has elapsed for three signal impulses to have been received, at which time brush B1 will have passed beyond segment 123. When the key depressed to transmit the first digit reaches normal, contacts 26 are opened and contacts 23 are closed; and, with brush B2 then in engagement with segment 125, the line loop circuit is closed to reoperate relay 105 before brush B1 again engages segment 120. The reoperation of relay 105 recloses the circuit for energizing relay 106, relay 106 remaining operated while each digit signal is being received. The reoperation of relay 105 also disconnects ground from conductor 108 to release any of relays 131, 132, 141, 142, 151 and 152 which were operated responsive to the first digit signal. Prior to the release of these relays, the first digit will have been registered by the A register as hereinafter described. When the key corresponding to the second digit of the called subscriber's number is depressed, the above-described cycle of operations is repeated to effect the selective operation of relays 131, 132, 141, 142, 151 and 152 according to the value of this digit. In like manner each of the succeeding digits of the called subscriber's number is transmitted over line L1 to effect the selective operation of these relays, the distributor D making one revolution for each digit.

When relay 131 or relay 132 is operated responsive to the first signal impulse of the first digit signal transmitted from a calling station, ground is connected to one of conductors 135 and 136 depending on which one of these relays is operated and ground is also connected to conductor 137 by the operation of either one of relays 131 and 132. If relay 131 is operated, a circuit is closed for operating relay 211 of the A register; or, if relay 132 is operated, a circuit is closed for operating relay 212 of the A register. The operated one of relays 211 and 212 locks until the register sender is released or the registered information has been utilized. If one of relays 141 and 142 is operated responsive to a second signal impulse for the first digit, ground is connected either to conductor 145 or to conductor 146 to operate relay 221 or relay 222 of the A register. And if one of relays 151 and 152 is operated responsive to a third signal simpulse for the first digit, ground is connected either to conductor 155 or to conductor 156 to operate relay 231 or relay 232 of the A register. The aforementioned connection of ground to conductor 137 causes the operative energization of register control relay 201. Relay 201 connects its winding in series with the winding of relay 202 to grounded conductor 107 but the winding of relay 202 is short-circuited as long as ground is connected to conductor 137. When relay 105 reoperates as above described at the end of the first digit signal, ground is disconnected from conductor 108 and the operated ones of relays 131, 132, 141, 142, 151 and 152 release; and ground is thereby disconnected from conductors 135, 136, 137, 145, 146, 155 and 156. The disconnection of ground from conductor 137 opens the short-circuit across the winding of relay 202 so that relay 202 is now operatively energized in series with the winding of relay 201. With relay 202 operated, conductors 135, 136, 137, 145, 146, 155 and 156 are extended to the B register control relays and B register, which are similar to the A register control relays and A register. Thus the selective operation of relays 131, 132, 141, 142, 151 and 152 responsive to the signal impulses transmitted by the depression of the key corresponding to the second digit of the called number effects the registration of this digit by the operation of one or more of the B register relays. In like manner, the succeeding digits of the called number are transmitted to selectively operate relays 131, 132, 141, 142, 151 and 152 and effect the registration of the digit by the relays of a corresponding register.

The selective operation of the register relays of the A register and each of the other registers establishes circuit conditions representing any one of digits 0 to 9 and four additional circuit conditions representing four other signals which the key-set KS is capable of transmitting. The manner in which the registered information is to be used will determine the control established by these fourteen circuit conditions. Assuming that individual digit registers are provided for each numerical value, two such registers 0 and 9 are shown. The circuit for operating register 0 is traced from ground at the armature of relay 212, back contact of relay 212, front contact of relay 211, back contacts of relays 221 and 222 and back contacts of relays 231 and 232 to battery through the winding of register 0. The circuit for operating register 9 is traced from ground at the armature of relay 212, back contact of relay 212, front contact of relay 211, front contact of relay 222, back contact of relay 221, front contact of relay 232 and back contact of relay 231 to battery through register 9.

The following table shows the fourteen different signals, the signal impulses corresponding thereto, the corresponding relays which are operated responsive to the signal impulses and the register relays operated to register the various signals:

| Signal | Signal Impulses | | | Signal Relays Operated | Register Relays Operated |
|---|---|---|---|---|---|
| | 1st | 2nd | 3rd | | |
| 1 | A. C. | -------- | -------- | 131 | 211 |
| 2 | D. C. | -------- | -------- | 132 | 212 |
| 3 | A. C. | A. C. | -------- | 131, 141 | 211, 221 |
| 4 | A. C. | D. C. | -------- | 131, 142 | 211, 222 |
| 5 | D. C. | A. C. | -------- | 132, 141 | 212, 221 |
| 6 | D. C. | D. C. | -------- | 132, 142 | 212, 222 |
| 7 | A. C. | A. C. | A. C. | 131, 141, 151 | 211, 221, 231 |
| 8 | A. C. | A. C. | D. C. | 131, 141, 152 | 211, 221, 232 |
| 9 | A. C. | D. C. | A. C. | 131, 142, 151 | 211, 222, 231 |
| 10 | A. C. | D. C. | D. C. | 131, 142, 152 | 211, 222, 232 |
| 11 | D. C. | A. C. | A. C. | 132, 141, 151 | 212, 221, 231 |
| 12 | D. C. | A. C. | D. C. | 132, 141, 152 | 212, 221, 232 |
| 13 | D. C. | D. C. | A. C. | 132, 142, 151 | 212, 222, 231 |
| 14 | D. C. | D. C. | D. C. | 132, 142, 152 | 212, 222, 232 |

It is of course possible to provide for more than fourteen signals, the additional signals requiring the transmission of additional impulses. For instance, with a maximum of four impulses per signal, thirty different signals may be transmitted.

What is claimed is:

1. In a signaling system in which different signals consist of either one, two or three impulses of current in succession, each impulse being either alternating current or direct current, the number of impulses and character of each impulse depending upon the particular signal being transmitted, signal receiving means comprising means for selectively responding to the first impulse of a signal depending upon whether the impulse is of one character or the other, means for selectively responding to the second impulse of a signal depending upon whether the impulse is of one character or the other, means for selectively responding to the third impulse of a signal depending upon whether the impulse is of one character or the other, a start-stop distributor with a position for each of said impulse responding means, and means responsive to the first impulse of a signal independent of the type of current for starting said distributor, thereby directing each impulse of a signal to a different one of said selective responding means.

2. In a signaling system in which different signals consist of either one, two or three impulses of current in succession, each impulse being either alternating current or direct current, the number of impulses and character of each impulse depending upon the particular signal being transmitted, means for transmitting any one of said different signals and including means for making the first impulse of each different signal longer than succeeding impulses of any signal, signal receiving means comprising means for selectively responding to the first impulse of a signal depending upon whether the impulse is of one character or the other, means for selectively responding to the second impulse of a signal depending upon whether the impulse is of one character or the other, means for selectively responding to the third impulse of a signal depending upon whether the impulse is of one character or the other, a start-stop distributor with a position for each of said impulse responding means, means responsive to the first impulse of each signal for starting said distributor thereby to direct each impulse of a signal to a different one of said selective responding means, and register means controlled by said selective responding means.

3. In a signaling system, a line, a signal transmitting station connected to said line and comprising a first set of contacts normally closed in series with said line, an inductance, a capacitance, a second set of contacts for connecting said inductance in series, with said line, a third set of contacts for connecting said capacitance in series with said line, a plurality of self-restoring keys one for each different signal which it may be desired to transmit over said line, the actuation of each of said keys being effective to open said first set of contacts until the key restores to normal, and means controlled by each of said keys while being restored to normal to close either said second set or said third set of contacts to transmit a signal consisting of one current impulse, to close either said second set or said third set of contacts to transmit the first current impulse and to close either said second set or said third set of contacts to transmit the second impulse of a signal consisting of two current impulses in succession or to close either said second set or said third set of contacts to transmit the first current impulse and to close either said second set or said third set of contacts to transmit the second impulse and to close either said second set or said third set of contacts to transmit the third impulse of a signal consisting of three current impulses in succession, and signal receiving means connected to said line to selectively respond to the signal transmitted over said line by the actuation of any one of said keys.

4. A signaling system according to claim 3, said signal receiving means comprising a first relay connected in series with said line and said first set of contacts, a second relay operated responsive to the operation of said first relay and slow to release, a first set of relays including a relay adapted for operation by alternating current and a relay adapted for operation by direct current, second and third sets of relays similar to said first set of relays, distributor means for connecting said line to said first set of relays while the first current impulse of a signal is being transmitted over said line to said second set of relays while the second current impulse of a signal is being transmitted over said line and to said third set of relays while the third current impulse of a signal is being transmitted over said line, and means responsive to the release of said first relay upon the opening of said first set of contacts at said signal transmitting station for initiating the operation of said distributor.

5. A signaling system according to claim 3, said signal receiving means comprising a first relay connected in series with said line and said first set of contacts, a second relay operated responsive to the operation of said first relay and slow to release, a first set of relays including a relay adapted for operation by alternating current and a relay adapted for operation by direct current, second and third sets of relays similar to said first set of relays, distributor means for connecting said line to said first set of relays while the first current impulse of a signal is being transmitted over said line, to said second set of relays while the second current impulse of a signal is being transmitted over said line and to said third set of relay while the third current impulse of a signal is being transmitted over said line, means responsive to the release of said first relay upon the opening of said first set of contacts at said signal transmitting station for initiating the operation of said distributor, and register means controlled by said relays to register each signal transmitted over said line.

JOHN M. MELICK.

REFERENCES CITED

The following references are of record in the file of this patent:

UNITED STATES PATENTS

| Number | Name | Date |
|---|---|---|
| 1,672,005 | Sorenson | June 5, 1928 |
| 2,367,522 | Pfleger | Jan. 16, 1945 |
| 2,381,499 | Jackel | Aug. 7, 1945 |
| 2,393,377 | Jackel | Jan. 22, 1946 |
| 2,396,134 | Sorenson | Mar. 5, 1946 |
| 2,400,148 | Hubbard | May 14, 1946 |
| 2,401,729 | Goldsmith | June 11, 1946 |
| 2,411,191 | Burcky | Nov. 19, 1946 |
| 2,411,375 | Jackel | Nov. 19 1946 |